United States Patent [19]
Campbell

[11] Patent Number: 4,969,599
[45] Date of Patent: Nov. 13, 1990

[54] SCENT-SIGHT-RANGE MARKER

[76] Inventor: Dennis Campbell, 23119 Ball Alley Rd., Loudonville, Ohio 44842

[21] Appl. No.: 340,680

[22] Filed: Apr. 20, 1989

[51] Int. Cl.$^5$ .................. A61L 9/04; A01M 31/00
[52] U.S. Cl. ..................... 239/57; 239/47; 239/51.5; 239/55; 239/58; 43/1
[58] Field of Search .............. 239/43, 51.5, 53, 55, 239/57, 47, 59, 276, 49; 47/48.5; 43/1, 2; 206/0.5

[56] References Cited
U.S. PATENT DOCUMENTS

| | | | |
|---|---|---|---|
| 2,609,230 | 9/1952 | Raleigh | 239/47 |
| 2,959,354 | 11/1960 | Beck | 239/36 |
| 3,046,192 | 7/1962 | Bilyeu | 239/9 |
| 4,194,690 | 3/1980 | Stever et al. | 239/57 |
| 4,381,623 | 5/1983 | Koistinen | 47/48.5 |
| 4,523,717 | 6/1985 | Schwab | 239/56 |
| 4,552,307 | 11/1985 | Stedham | 239/57 |
| 4,667,430 | 5/1987 | Ziese, Jr. | 43/1 |
| 4,773,178 | 9/1988 | Marek | 43/2 |

Primary Examiner—Andres Kashnikow
Assistant Examiner—Christopher G. Trainor
Attorney, Agent, or Firm—Mack D. Cook, II

[57] ABSTRACT

Article for scent-sight-range (SSR) use in hunting legal game animals comprising a cover telescopically housing a spike body enclosing a preformed column of absorbent material for saturation with a hunter selected lure liquid.

4 Claims, 6 Drawing Sheets

SCENT-SIGHT-RANGE MARKER

BACKGROUND OF THE INVENTION

The present invention relates to an article for scent-sight-range (SSR) of legal game animals being hunted by sportsmen in woods and fields. An article according to the invention may be carried securely closed by a hunter to chosen hunting grounds, easily set into the ground at a clear site and at a predetermined distance, quickly opened to dispense the odor of a liquid based animal scent and thereafter enable a hunter to lure by scent, to see by sight and to determine the distance and range of the game animal from the hunting point or stand. The improved SSR article is a composite structure precision molded from state of the art plastic compounds so as to have a long useful life.

The scope and content of the prior art has been determined as explained below.

U.S. Pat. No. Des. 268,695, April 1983, Kolf, discloses an ornamental design for a deer scent dispenser.

U.S. Pat. No. 2,959,354, November 1960, Beck, discloses a buck lure 10 having a cup-shaped container 12 mating with a cupshaped cover 14 and a threaded rod 50 engaging a stem 18 turnable to release an odor of lure liquid from a mass of saturated cotton 36. The lure 10 is intended for hanging by a cord or chain 64.

U.S. Pat. No. 3,046,192, July 1962, Bilyeu, discloses the chemical composition of an animal lure scent activated by heat from a catalytic-type hand warmer.

U.S. Pat. No. 3,119,650, Jan. 1964, also Bilyeu, is a continuation-in-part of No. 3,046,192, and discloses and claims a catalytic-type warmer 12 with a fuel case 10.

U.S. Pat. No. 4,302,899, Dec. 1981, DeHart, discloses a hunter and trapper's scent pad 10.

U.S. Pat. No. 4,523,717, June 1985, Schwab, discloses an animal trail marker and scent container patentable over No. 2,959,354, Beck and No. 3,119,650, Bilyeu. The article 10 has an elongated sleave 12 divided by a transverse partition 14 into opposite and outwardly opening cavities 16 and 18. The upper cavity 18 is closed by a cap 32 with an opening 50 for a hanging line 52. A threaded shank 34 projects through the partition 14 and the lower cavity 16 to carry a lower cap 22 which received an annular body of absorbent material 28 saturated with a selected animal scent.

U.S. Pat. No. 4,609,245, September 1986, Sakschek, discloses a dispenser 10 with a body portion 12, a cap 14 and a lure fluid dispensing tip 16. This invention was also patentable over No. 2,959,354, Beck, as well as No. 3,046,192, Bilyeu, cited above.

SUMMARY OF THE INVENTION

It is an object of the present invention to provide an improved article for scent-sight-range (SSR) of legal game animals.

It is a further object to provide an article for use by sportsmen in woods and fields which may be carried in the pocket of a hunter securely closed so that a liquid animal lure scent will not leak onto the hunter's clothing. When the hunter reaches the hunting ground the article is easily pushed into the ground at a site easy to see from the hunting stand. The article is then opened, a predeterminable amount to vary the scent pattern depending upon weather and wind conditions. The articles may be made of colored plastic so that several may be set out to mark different distances or a range from the hunting stand. E.g., blue at 10 yards, yellow at 20 yards, red at 30 yards. At the end of the hunt, each article is closed, picked up and pocketed by the hunter for use again another day.

Usually, scent-sight-range (SSR) articles according to the invention will be sold to hunters in sets of three, each having a distinctive color, together with a bottle of animal scent lure liquid and rubber gloves for handling the SSR when filling with lure liquid.

According to the invention, an article for use in hunting game animals comprises a cover telescopically housing a spike body enclosing a preformed column of absorbent material for saturation with a hunter selected lure liquid. The cover has an elongated liquid impermeable body and a closed end. The spike body is elongated and slidable within the cover and has an outer shank portion, a medial seal portion adapted to seal off any lure liquid in the absorbent material, and an inner reservoir portion for receiving a column of absorbent material. The reservoir portion has peripheral openings for controlled release of lure liquid.

IN THE DRAWINGS

DETAILED DESCRIPTION OF THE INVENTION

Figure 1:
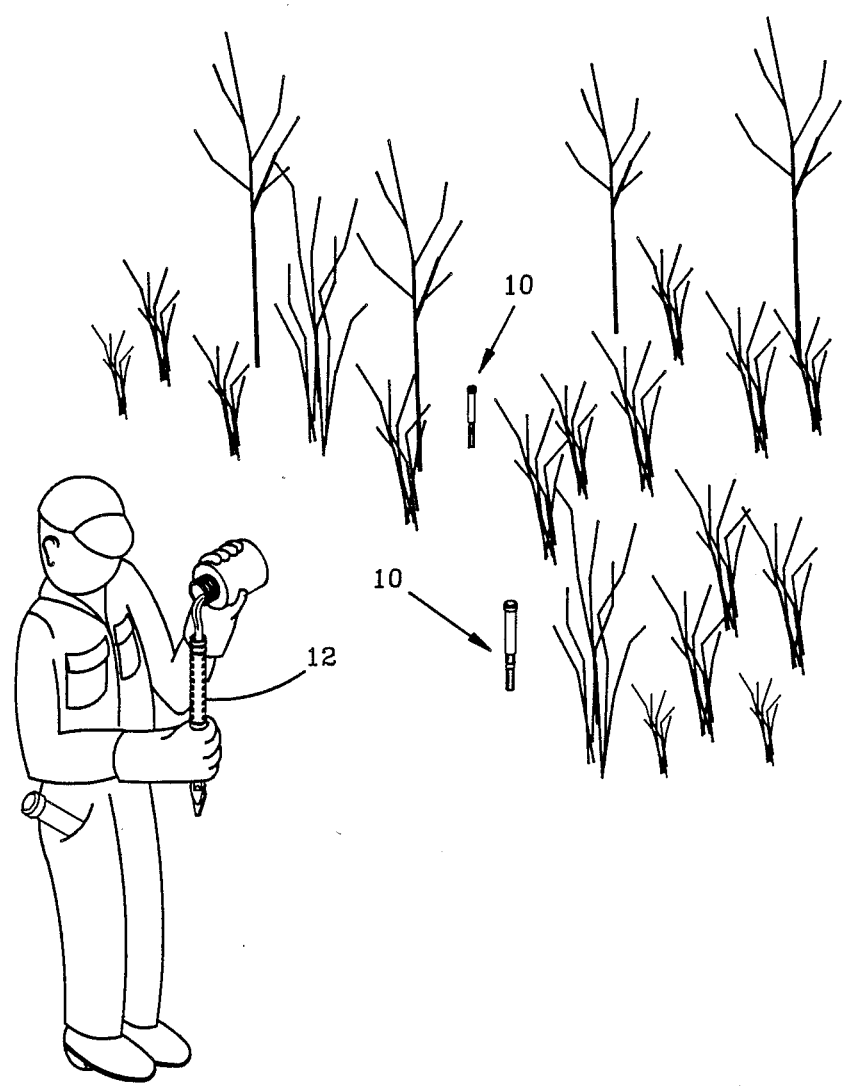
FIG. 1 is a pictorial view showing filling of an SSR article with lure liquid by a hunter from a small container using rubber gloves, and also showing trees with the SSR set out for sight and various range distances.
Figure 2:
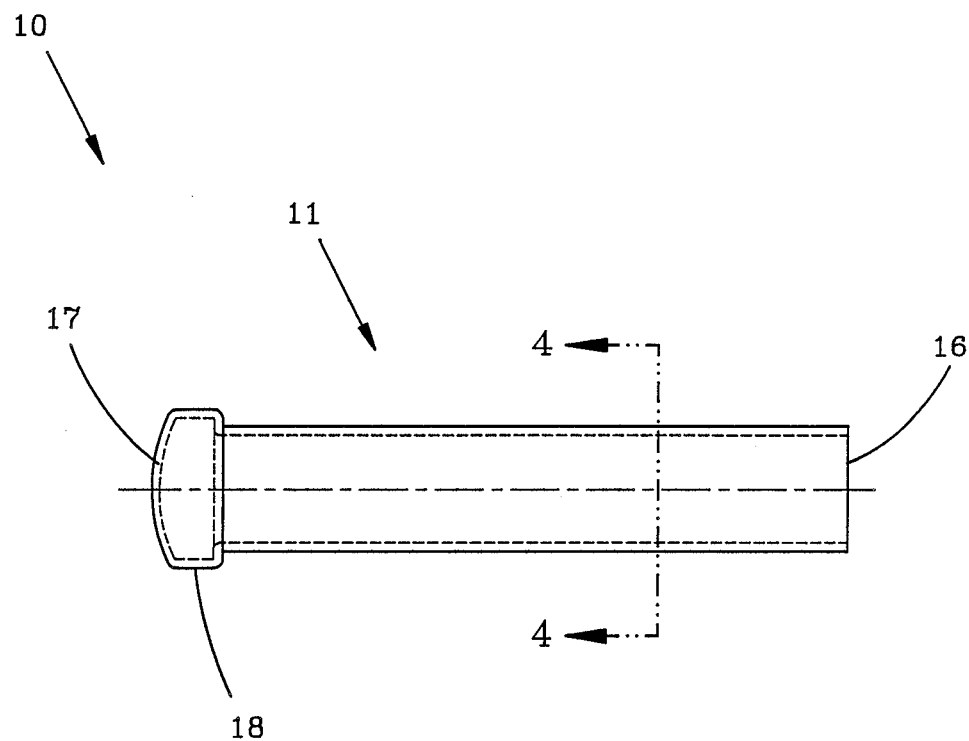
FIG. 2 is a view of the cover of the SSR.
Figure 3:
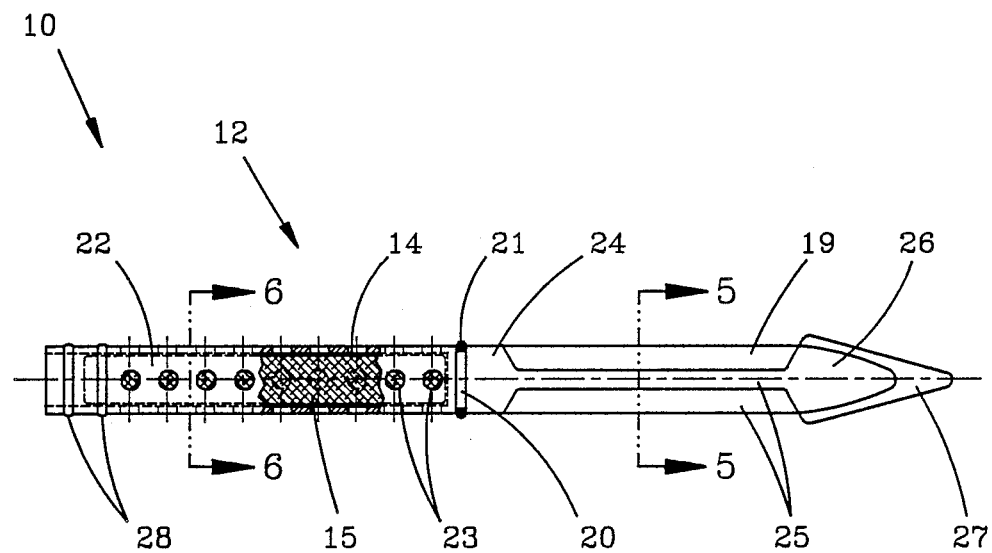
FIG. 3 is a view of the spike body of the SSR.
Figure 4:
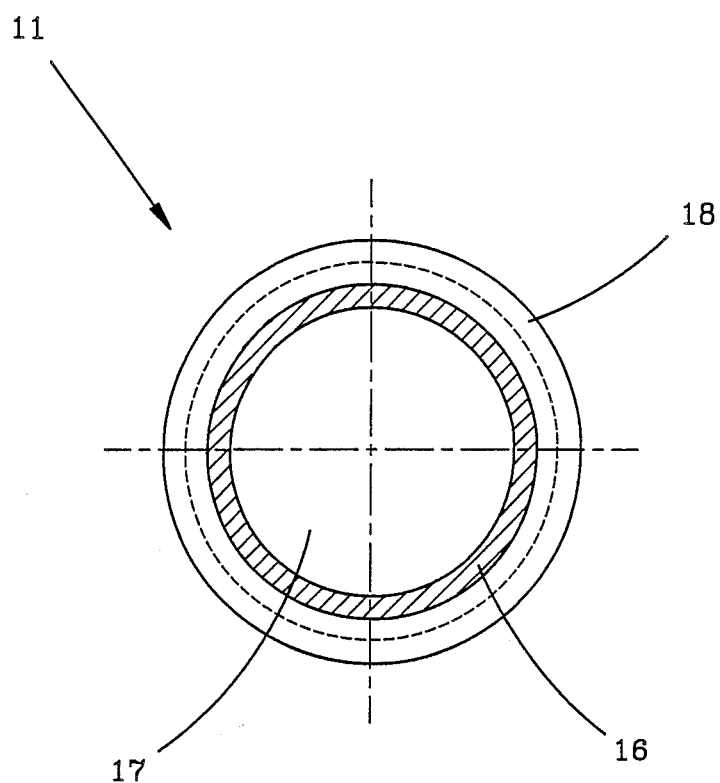
FIG. 4 is a section taken on line 4—4 of FIG. 2.
Figure 5:
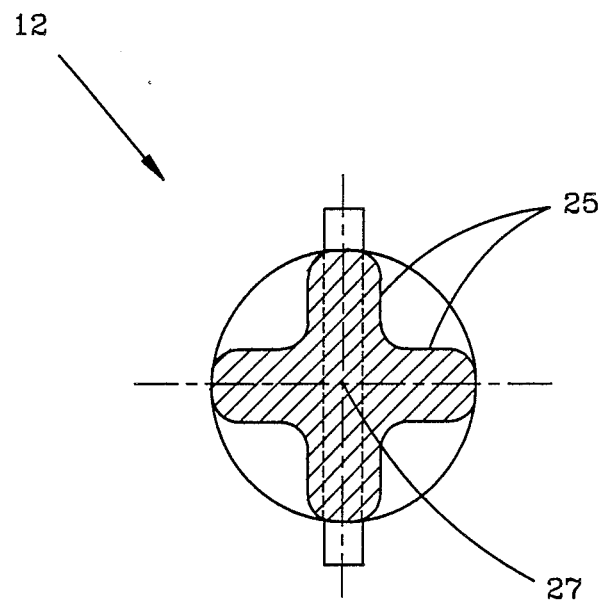
FIG. 5 is a section taken on line 5—5 of FIG. 3.
Figure 6:
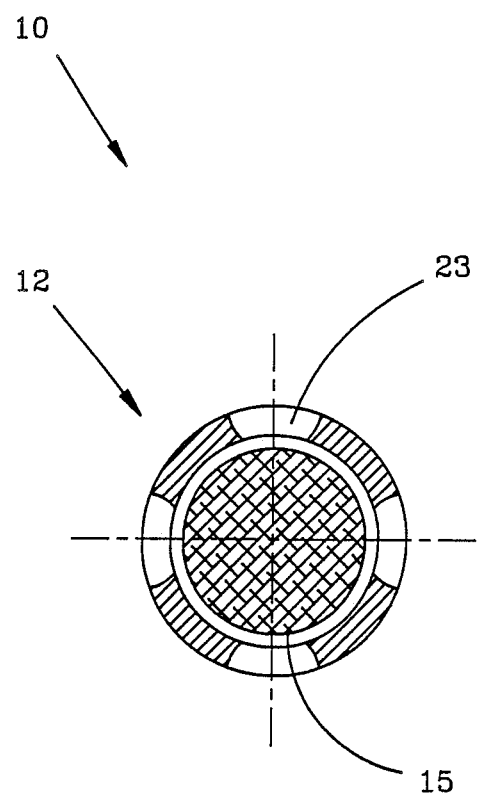
FIG. 6 is a section taken on line 6—6 of FIG. 3.

An article according to the invention is indicated generally by the numeral 10. An article 10 will provide a legal game hunter, particularly an archer, with a scent-sight-range (SSR) capability.

An article 10 comprises a cover 11 telescopically housing a spike body 12 enclosing a preformed column of absorbent material 14 for saturating with a hunter selected lure liquid, referred to generally by the numeral 15.

The cover 11 is preferably cylindrical providing an elongate liquid impermeable body with an open end 16 and a closed end 17. The cover closed end 17 is preferably formed as a knob 18, so that the hunter may site the article 10 in the ground by transferring impact energy to the spike body 12.

The spike body 12 is also preferably cylindrical and elongate to go through the open end 16 and slide coaxially within the cover 11. The spike body 12 has an outer shank portion 19, a medial seal portion 20 preferably adapted to seat an elastomeric O-ring seal 21, for lure liquid 15 in the absorbent material 14, and an inner reservoir portion 22 receiving the absorbent material 14 and intended for mating engagement with the cover closed end 17. The reservoir portion 22 may have any number of peripheral openings 23 for release of vaporized lure liquid 15 directly from the preformed column of absorbent material 14 in the absorbent material 14 when the cover 11 is raised by the hunter away from the medial seal portion 20.

The spike body preferably has a collar 24 adjacent the medial seal portion 20 for the O-ring seal 21. A plurality of, preferably four, elongate fluted ribs 25 extend from the collar 24 to a ground spike end 26. As shown, the spike end 26 carried by the fluted ribs 25 may be blunt arrow-shaped as at 27 to easily set in the ground and yet not endanger the hunter or tear the hunter's clothing. Also as shown, the end of the spike body reservoir portion 22 has at least one, preferably two, side-by-side circumferentially projecting rings 28. A ring 28 will have an effective diameter to stabilize and guide telescopic movement of a cover 11 relative to a spike body 12.

What is claimed is:

1. An article for use in hunting legal game animals comprising a cover telescopically housing a spike body enclosing a preformed column of absorbent material for saturation with a hunter selected lure liquid, said cover having an elongate liquid impermeable body and a closed end, said spike body being elongate and slidable within said cover and having an outer shank portion, a medial seal portion adapted to positively seal off any lure liquid in said preformed column of absorbent material, and an inner reservoir portion for receiving said preformed column of absorbent material, said reservoir having a number of peripheral openings communicating directly with said preformed column of absorbent material for controlled release of any lure liquid in said preformed column of absorbent material.

2. An article according to claim 1 wherein:
said cover closed end is adapted for mating engagement with said spike body reservoir portion to transfer impact energy to said spike body.

3. An article according to claim 1 wherein:
said spike body has a collar adjacent said medial seal portion, a plurality of elongate fluted ribs extending from said collar and a spike end carried by said fluted ribs.

4. An article according to claim 3 wherein:
said spike body openings are between said medial seal portion and at least one circumferentially projecting ring having an effective diameter for guiding telescopic movement of said cover relative to said spike body.

* * * * *